US012690072B2

(12) United States Patent
  Zhao

(10) Patent No.:  US 12,690,072 B2
(45) Date of Patent:  Jul. 21, 2026

(54) SIDELINK CONTROL METHOD AND APPARATUS, AND USER EQUIPMENT

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 342 days.

(21) Appl. No.: 18/002,193

(22) PCT Filed: Jun. 24, 2020

(86) PCT No.: PCT/CN2020/098261
  § 371 (c)(1),
  (2) Date: Dec. 16, 2022

(87) PCT Pub. No.: WO2021/258371
  PCT Pub. Date: Dec. 30, 2021

(65) Prior Publication Data
  US 2023/0345550 A1      Oct. 26, 2023

(51) Int. Cl.
  *H04W 74/00*      (2009.01)
  *H04W 74/08*      (2024.01)
  *H04W 74/0833*      (2024.01)

(52) U.S. Cl.
  CPC ....... *H04W 74/085* (2013.01); *H04W 74/002* (2013.01); *H04W 74/0866* (2013.01)

(58) Field of Classification Search
  CPC ............. H04W 74/085; H04W 74/002; H04W 74/0866; H04W 24/08; H04W 52/367;

H04W 52/383; H04W 92/18; H04W 76/23; H04W 72/535; H04W 72/40; H04W 76/14; H04W 48/02; H04W 4/40; H04W 72/25; Y02D 30/70
See application file for complete search history.

(56) References Cited

U.S. PATENT DOCUMENTS

| | | | |
|---|---|---|---|
| 11,689,401 B2 * | 6/2023 | Lee | H04L 5/0082 |
| | | | 370/336 |
| 2017/0019886 A1 | 1/2017 | Patel et al. | |
| 2019/0208441 A1 | 7/2019 | Wang et al. | |
| 2020/0236600 A1 * | 7/2020 | Hong | H04W 72/52 |

(Continued)

FOREIGN PATENT DOCUMENTS

| | | |
|---|---|---|
| CN | 111183694 A | 5/2020 |

OTHER PUBLICATIONS

Examination report for Indian Application No. 202347001340, issued on Feb. 15, 2023, 5 pages.

(Continued)

*Primary Examiner* — Thomas R Cairns
*Assistant Examiner* — Raenita Ann Fenner
(74) *Attorney, Agent, or Firm* — Finnegan, Henderson, Farabow, Garrett & Dunner, L.L.P.

(57) ABSTRACT

A method for sidelink control, includes: determining, by a user equipment, a sidelink channel busy measurement value corresponding to a first time unit; and determining, by the user equipment, a transmission limit of sidelink communication on a second time unit according to the sidelink channel busy measurement value, wherein the second time unit meets a defined condition with respect to the first time unit.

20 Claims, 2 Drawing Sheets obtaining, by a user equipment, a sidelink channel busy measurement value corresponding to a first time unit

201 determining, by the user equipment, a transmission limit of sidelink communication on a second time unit according to the sidelink channel busy measurement value; in which the second time unit meets a defined condition with respect to the first time unit

202

(56) References Cited

U.S. PATENT DOCUMENTS

2022/0377709 A1* 11/2022 Zhao ................. H04W 72/0446
2023/0007670 A1* 1/2023 Lee .................. H04W 28/0284

OTHER PUBLICATIONS

International Search Report and Written Opinion of International
Application No. PCT/CN2020/098261, mailed Feb. 25, 2021, 12
pages.
Notice of Reasons for Refusal for Japanese Application No. 2022-
579885, issued on Oct. 10, 2023, 8 pages.
3GPP TS 38.214 V16.1.0 (Mar. 2020), 3rd Generation Partnership
Project; Technical Specification Group Radio Access Network; NR;
Physical layer procedures for data (Release 16), 3 pages.
3GPP TS 38.215 V16.1.0 (Mar. 2020), 3rd Generation Partnership
Project; Technical Specification Group Radio Access Network; NR;
Physical layer measurements (Release 16), 3 pages.
European Patent Office, Extended European Search Report issued in
Application No. 20942282.3, dated Jan. 3, 2024, 8 pages.

* cited by examiner

SIDELINK CONTROL METHOD AND APPARATUS, AND USER EQUIPMENT

CROSS-REFERENCE TO RELATED APPLICATION

This application is a U.S. national phase of International Application No. PCT/CN2020/098261, filed on Jun. 24, 2020, the entire content of which is incorporated herein by reference.

FIELD

The present disclosure relates to a field of sidelink communication technologies, particularly to a method and an apparatus for sidelink control and a user equipment.

BACKGROUND

If a user equipment intends to send sidelink data, it may obtain a busy measurement value of a sidelink channel before sending the sidelink data to determine a transmission limit of the sidelink data. Due to the unpredictability of the arrival of the sidelink data, the user equipment may have to continuously measure the busy measurement value of the sidelink channel to ensure that the busy measurement value of the sidelink channel can be obtained in time when a sidelink data transmission is required.

SUMMARY

According to a first aspect of the present disclosure, a method for sidelink control is provided, and the method includes:

determining, by a user equipment, a sidelink channel busy measurement value corresponding to a first time unit; and determining, by the user equipment, a transmission limit of sidelink communication on a second time unit according to the sidelink channel busy measurement value; in which the second time unit meets a defined condition with respect to the first time unit.

According to a second aspect of the present disclosure, a user equipment is provided, and the user equipment includes a processor, a transceiver, and a memory storing programs executable by the processor. When the processor executes the executable programs, the above method for sidelink control are performed.

According to a third aspect of the present disclosure, a non-transitory computer-readable storage medium is provided. The storage medium has executable programs stored thereon. When the executable programs are executed by a processor, steps in the above method for sidelink control are performed.

It should be understood that the above general description and the following detailed description are only illustrative and explanatory, and do not limit the embodiments of the present disclosure.

BRIEF DESCRIPTION OF THE DRAWINGS

The drawings herein are incorporated into the specification and constitute a part of the specification, showing the embodiments conforming to the disclosure, and are used together with the specification to explain the principles of the embodiments of the disclosure.

DETAILED DESCRIPTION

Embodiments will be described in detail here, and their examples are shown in the accompanying drawings. When the following description refers to the drawings, unless otherwise indicated, the same number in different drawings indicates the same or similar elements. The embodiments described in the following embodiments do not represent all embodiments consistent with the embodiments of the disclosure. On the contrary, they are only examples of devices and methods consistent with some aspects of the embodiments of the disclosure as detailed in the appended claims.

The terms used in the embodiments of the present disclosure are only for the purpose of describing specific embodiments, and are not intended to limit the embodiments of the present disclosure. The singular forms of "one", "said" and "the" used in the embodiments of the present disclosure and the appended claims are also intended to include the majority forms, unless the context clearly indicates other meanings. It should also be understood that the terms "and/or" as used herein refer to and include any or all possible combinations of one or more associated listed items.

It should be understood that although the terms first, second, third, etc. may be used to describe various information in the embodiments of the present disclosure, such information should not be limited to these terms. These terms are only used to distinguish the same type of information from each other. For example, without departing from the scope of the embodiments of the present disclosure, the first information can also be called the second information, and similarly, the second information can also be called the first information. Depending on the context, the word "if" as used here can be interpreted as "when" or "while" or "in response to determining".

Figure 1:
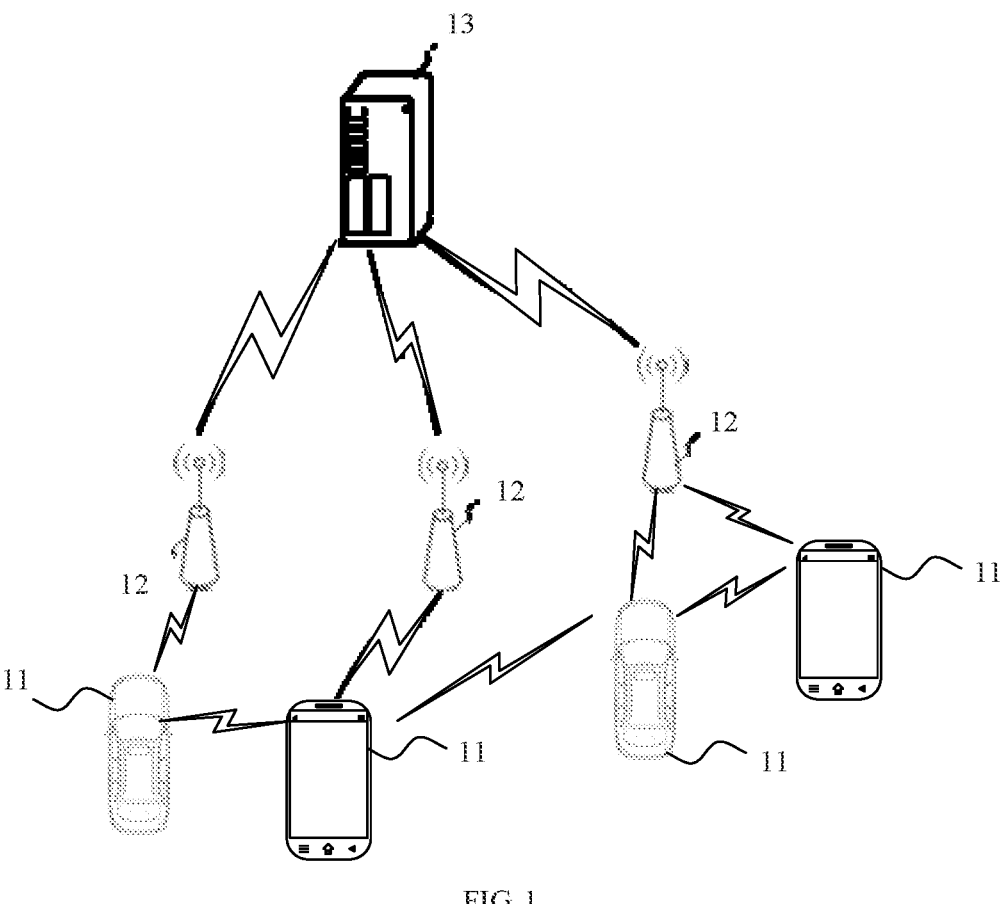
FIG. 1 is a block diagram of a wireless communication system according to an embodiment of the present disclosure.

As illustrated in FIG. 1, it illustrates a block diagram of a wireless communication system provided by an embodiment of the present disclosure. As illustrated in FIG. 1, the wireless communication system is a communication system based on cellular mobile communication technology. The wireless communication system may include several terminals 11 and several base stations 12.

The terminal 1I may refer to a device that provides voice and/or data connectivity to a user. The terminal 11 can communicate with one or more core networks through a radio access network (RAN). The terminal 11 may be an Internet-of-Things terminal, such as a sensor device, a mobile phone (also called as "cellular" phone) and a computer with an Internet-of-Things terminal, such as fixed, portable, pocket, handheld, computer built-in or vehicle-mounted devices, for example, a station (STA), a subscriber unit, a subscriber station, a mobile station, a mobile, a remote station, an access point, a remote terminal, an access terminal, a user terminal, a user agent, or a user equipment (UE). Alternatively, the terminal 11 can also be the equipment of an unmanned aerial vehicle. Alternatively, the terminal 11 can also be an on-board device, for example, a trip computer with wireless communication function, or a wireless communication device connected to an external trip computer. Alternatively, the terminal 11 can also be a roadside device, for example, a street lamp, a signal lamp or other roadside devices with wireless communication functions.

The base station 12 may be a network side device in the wireless communication system. The wireless communication system can be the fourth generation mobile communication (4G) system, also known as Long Term Evolution (LTE) system. Alternatively, the wireless communication system can also be the fifth generation mobile communication (5G) system, also known as a new radio (NR) system or a 5G NR system. Alternatively, the wireless communication system can also be a next generation system of the 5G system. The access network in the 5G system can be called NG-RAN (new generation radio access network). Alternatively, the wireless communication system can also be a machine type communication (MTC) system.

The base station 12 can be an evolutionary base station (eNB) used in the 4G system. Alternatively, the base station 12 can also be a base station adopted a centralized and distributed architecture (gNB) in the 5G system. When the base station 12 adopts the centralized and distributed architecture, it usually includes a central unit (CU) and at least two distributed units (DU). The central unit is equipped with protocol stacks of a Packet Data Convergence Protocol (PDCP) layer, a Radio Link Control (RLC) layer and a Media Access Control (MAC) layer. The distribution units are provided with a physical (PHY) layer protocol stack. The embodiments of the present disclosure do not limit the specific implementation mode of the base station 12.

A wireless connection can be established between the base station 12 and the terminal 11 through a wireless radio. In different embodiments, the wireless radio is a wireless radio based on the fourth generation mobile communication network technology (4G) standard. Alternatively, the wireless radio is a wireless radio based on the fifth generation mobile communication network technology (5G) standard. For example, the wireless radio is a new radio. Alternatively, the wireless radio can also be a wireless radio based on a standard of the next generation mobile communication network technical of 5G.

In some embodiments, an E2E (End to End) connection can also be established between terminals 11, such as V2V (vehicle to vehicle) communication, V2I (vehicle to infrastructure) communication and V2P (vehicle to pedestrian) communication in vehicle to everything (V2X) communication.

In some embodiments, the wireless communication system described above may also include a network management device 13.

Several base stations 12 are connected to the network management device 13 respectively. The network management device 13 can be a core network device in the wireless communication system. For example, the network management device 13 can be a mobility management entity (MME) in an evolved packet core (EPC). Alternatively, the network management device can also be other core network devices, such as a service gateway (SGW), a public data network gateway (PGW), a policy and charging rules function (PCRF) or a home subscriber server (HSS). The embodiments of the present disclosure do not limit the implementation form of the network management device 13.

Execution subjects involved in the embodiments of the present disclosure include, but are not limited to, a user equipment (UE) in a cellular mobile communication system, a base station of the cellular mobile communication, etc.

In order to facilitate understanding of the technical solution of the embodiments of the present disclosure, the related technologies of the embodiments of the present disclosure are described below.

The technical solution of the embodiments of the present disclosure can, but is not limited to, be used in a V2X communication system. The scenarios supported by the V2X communication include: V2V communication, V2I communication, and V2P communication. By supporting the V2V communication, V2I communication and V2P communication, the V2X communication system can effectively improve traffic safety, improve traffic efficiency and enrich people's travel experience. Using the existing cellular communication technology to support the V2X communication can effectively utilize the deployment of existing base stations, reduce equipment overhead, and is more conducive to providing Quality of Service (QoS) guaranteed services to meet the needs of Internet of Vehicles business. Therefore, cellular network support for the V2X communication is provided, that is, cell-based V2X (C-V2X). In C-V2X, the communication between on-board equipment and other equipment can be transferred through the base station and the core network, that is, the communication link between the user equipment and the base station in the original cellular network can be used for communication. The communication can be uplink (UL) communication or downlink (DL) communication. The communication can also be implemented directly through the direct link between devices. Here, the direct link can also be called a sidelink (SL). Compared with UL/DL communication (that is, communication through Uu interface). SL communication has the characteristics of short delay, low overhead, etc., and is very suitable for direct communication between on-board equipment and other peripheral equipment with close geographical location.

With the development of the new generation of 5G mobile communication technology, the 5G NR technology is used to support the services and scenarios of the new V2X (called 5G V2X or NR V2X), such as vehicles plating, extended sensors, advanced driving and remote driving. In general, the new V2X can provide higher communication rate, shorter communication delay and more reliable communication quality. However, the new V2X technology mainly considers the communication between on-board devices, and little consideration is given to the requirements of mobile terminals such as handheld devices (such as power saving requirements).

The LTE V2X and NR V2X define the user equipment's measurement of channel congestion, that is, the user equipment may measure a sidelink channel busy measurement value corresponding to a slot. Here, the sidelink channel busy measurement value can also be referred to as, in a measurement window from slot n-a to slot n−1, a channel busy ratio (CBR) measurement value. In TS 38.215, the CBR measurement value measured in slot n is defined as a proportion of sub channels having a received signal strength indication (RSSI) measurement value greater than a configured threshold in a sidelink resource pool. According to the high-level configuration, a value of a can be 100 or related to a subcarrier spacing of sidelink communication (referred to as a subcarrier spacing for short). For example, when the value of the subcarrier spacing is $15 \cdot 2^{\mu}$ KHz, $a=100 \cdot 2^{\mu}$.

When the user equipment sends sidelink data in slot i, the user equipment may determine, according to a CBR measurement value corresponding to slot i-N, a transmission parameter that can be used. In addition, LTE V2X/NR V2X supports congestion control based on channel congestion. When the user equipment sends sidelink data in the slot i, it may determine, according to configuration information and the CBR measurement value corresponding to the slot i-N, a maximum proportion of time-frequency resources that user equipment can use for its own sidelink data transmission to system time-frequency resources. The user equipment may ensure that the number of time-frequency resources used by its own sidelink data transmission does not exceed the maximum proportion. Here, the value of N is related to the capacity of the user equipment and the subcarrier spacing used for sidelink communication.

For example, in NR V2X, the user equipment may ensure that any sidelink data priority k satisfies the following formula:

$$\sum_{L\geq k}CR(L)\leq CR_{Limit}(K) \tag{1}$$

Where, CR (L) is a CR (channel occupancy ratio) measurement value of the user equipment corresponding to priority L on slot i-N; $CR_{Limit}(K)$ is a CR threshold corresponding to the priority L determined by the user equipment according to the high-level configuration and a CBR measurement value on slot i-N.

According to the above solution, when the user equipment intends to send sidelink data in slot n, it may obtain the CBR measurement value in slot n-N to determine a value range of the transmission parameter and perform congestion control. Due to the unpredictability of data arrival, the user equipment may continuously measure the CBR measurement value to ensure that CBR measurement value can be obtained in time when data is transmitted. However, the continuous measurement operations may consume a large amount of energy of the user equipment, which is not conducive to energy-saving operation of the user equipment. To this end, the following technical solutions of the embodiments of the present disclosure are proposed.

Figure 2:
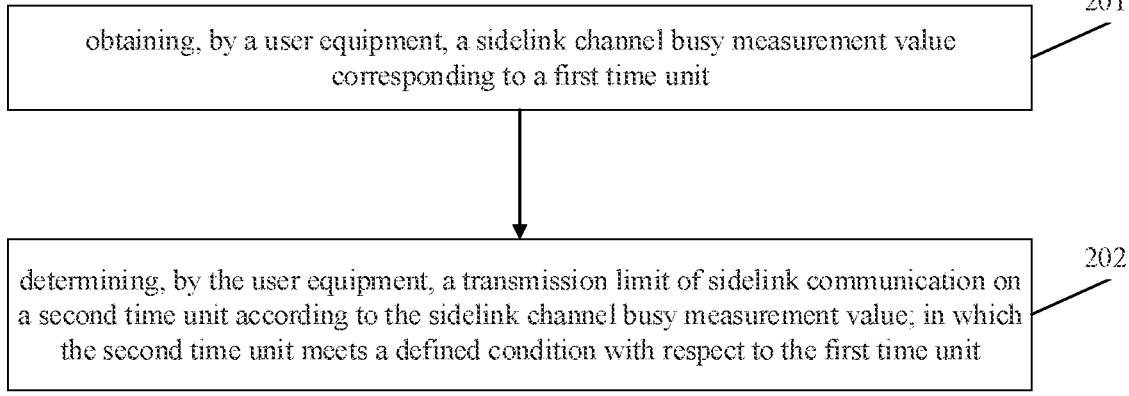
FIG. 2 is a flow chart of a method for sidelink control according to an embodiment of the present disclosure.

FIG. 2 is a flow chart of a method for sidelink control according to an embodiment of the present disclosure. As illustrated in FIG. 2. The method for sidelink control includes the following steps.

Step 201, a user equipment determines a sidelink channel busy measurement value corresponding to a first time unit.

In an optional implementation of the present disclosure, a time unit may be a frame, or a sub frame, or a time slot, or a symbol, etc. In another optional implementation of the present disclosure, the time unit can be seconds, or milliseconds, or microseconds.

In an embodiment of the present disclosure, the user equipment can obtain the sidelink channel busy measurement value corresponding to the first time unit in the following ways.

The user equipment determines a measurement time unit set according to the first time unit. The user equipment measures a sidelink channel on the measurement time unit set to determine the sidelink channel busy measurement value.

Alternatively, the measurement time unit set may meet at least one of the following limitations:

Limitation 1: time units in the measurement time unit set is not later than the first time unit, and a distance between the first time unit and each time unit within the measurement time unit set is not greater than a second time length threshold.

Limitation 2: The number of time units in the measurement time unit set is not less than a first number threshold.

In the above solution, it can be understood that the measurement time unit set corresponds to a measurement window, a starting position of the measurement window corresponds to the earliest time unit in the measurement time unit set, and an ending position of the measurement window corresponds to the latest time unit in the measurement time unit set.

For the above limitation 1, the measurement window is located before the first time unit, and a distance between the measurement window and the first time unit is less than or equal to the second time length threshold.

For the above limitation 2, the number of time units included in the measurement window is greater than or equal to the first number threshold.

In an example, for example, the time unit is a time slot, the first time unit can be slot n. The measurement time unit set corresponding to slot n (that is, the measurement window) includes multiple time slots from slot n-a1 to slot n-a2, where a1 and a2 are positive integers, and a1 is greater than a2. For the above limitation 1, a1 is less than or equal to the second time length threshold. For the above limitation 2, a1-a2 is greater than or equal to the first number threshold.

In another example, for example, the time unit is a time slot, the first time unit can be slot n. The measurement time unit set corresponding to slot n includes multiple discontinuous time slots of {slot n-a1, slot n-a2, slot n-a3, . . . , slot n-ak}, where a1>a2>a3> . . . >ak≥N, where N is a necessary processing time for the user equipment to make measurement. For the above limitation 1, the second time length threshold ≥a1>a2>a3> . . . >ak. For the above limitation 2, k is greater than or equal to the first number threshold.

In the above solution, the second time length threshold can be determined in any of the following ways.

Way 1-1: The user equipment determines the second time length threshold based on a state of the user equipment.

The second time length threshold is determined based on the state of the user equipment, and different states of the user equipment correspond to different second time length thresholds.

Way 1-2: A second time length threshold corresponding to each state of the user equipment is determined through downlink control information sent by a base station.

Way 1-3: A second time length threshold corresponding to each state of the user equipment is determined according to a communication protocol.

Way 1-4: The second time length threshold is determined through predefined or preconfigured information Optionally, for the above ways 1-2, 1-3 and 1-4, the second time length threshold is determined according to the communication protocol, or dynamically configured (such as dynamically configured through the downlink control information) according to a network side device (such as the base station). Different user equipments can correspond to different second time length thresholds. The second time length threshold can also be determined based on the state of the user equipment. Different states of the user equipment correspond to different second time length thresholds.

It should be noted that the states of the user equipment can be an energy-saving state or a non energy-saving state. Alternatively, the state of the user equipment can also be a state of transmitting a service of a certain priority, such as a state of transmitting a high priority service or a low priority service. Here, "high priority service" or "low priority service" are only examples. During specific implementation, different priorities can be assigned to different types of services.

In the above solution, optionally, the first number threshold can be determined in any of the following ways.

Way 2-1: The user equipment determines the first number threshold based on a state of the user equipment.

The first number threshold is determined based on the state of the user equipment, and different states of the user equipment correspond to different first number thresholds.

Way 2-2: The user equipment determines the first number threshold through downlink control information sent by the base station, or obtains the first number threshold through predefined or preconfigured information.

Way 2-3: The user equipment determines the first number threshold through an identifier indicating the first number threshold sent by the base station, and a correspondence between the identifier and the first number threshold in the communication protocol.

Way 2-4: The user equipment determines the first number threshold through the identifier indicating the first number threshold sent by the base station, and a correspondence between the identifier and the first number threshold sent by the base station.

Way 2-5: The user equipment predefines or preconfigured information determines the first number threshold.

Optionally, for the above ways 2-2, 2-3, 2-4 and 2-5, the first number threshold is determined according to the communication protocol, predefined or preconfigured, or dynamically configured (such as dynamically configured through downlink control information) according to the network side device (such as the base station). Different user equipments may correspond to different first number thresholds. The first number threshold can also be determined based on the state of the user equipment. Different states of the user equipment correspond to different first number thresholds.

Optionally, the second time length threshold and/or the first number threshold may take different values according to different user equipment capabilities, subcarrier spacing, or frequency bands used for sidelink communication.

In an embodiment of the present disclosure, the user equipment measures the sidelink channel on the measurement time unit set to determine the sidelink channel busy measurement value, which can be realized in the following ways.

The user equipment measures the sidelink channel on the measurement time unit set, to obtain an RSSI measurement value of the sidelink channel, and then the user equipment determines a proportion of the sidelink channels whose RSSI measurement values exceed an RSSI threshold value. This proportion is taken as the sidelink channel busy measurement value.

In an embodiment of the present disclosure, the sidelink channel busy measurement value can also be referred to as a CBR measurement value.

It should be noted that the above solution is illustrated by taking the acquisition of the sidelink channel busy measurement value of the first time unit as an example. The sidelink channel busy measurement value of any time unit can be acquired in the same way.

Step 202, the user equipment determines a transmission limit of sidelink communication on a second time unit according to the sidelink channel busy measurement value.

The second time unit meets a defined condition with respect to the first time unit.

In some embodiments of the present disclosure, the user equipment determines the transmission limit of the sidelink communication on the second time unit according to the sidelink channel busy measurement value of the first time unit. The second time unit meets the defined condition with respect to the first time unit. In other words, the user equipment can obtain a corresponding sidelink channel busy measurement value by performing a measurement operation on a time unit that meets the defined condition with respect to the first time unit, instead of continuously performing measurement operations on all time units. In this way, the energy consumption of the user equipment can be effectively saved.

In some embodiments of the present disclosure, the transmission limit of the sidelink communication on the second time unit includes at least one of: a maximum sending power allowed, an available modulation coding methods; a maximum duration occupied by a transmission; a number of frequency resources occupied by a transmission; a maximum number of retransmissions of a data block; an upper limit of CR.

The user equipment can transmit the sidelink data in the second time unit based on at least one of the above transmission limits.

In an embodiment of the present disclosure, the defined condition that the second time unit meets with respect to the first time unit includes: a time interval between the first time unit and the second time unit is not greater than a first time length threshold.

In the above solution, the first time length threshold can be determined in any of the following ways.

Way 3-1: The first time length threshold is determined through downlink control information sent by the base station.

Way 3-2: The user equipment determines the first time length threshold through an identifier indicating the first time length threshold sent by the base station, and a correspondence between the identifier and the first time length threshold in a communication protocol.

Way 3-3: The user equipment determines the first time length threshold through an identifier indicating the first time length threshold sent by the base station, and a correspondence between the identifier and the first time length threshold sent by the base station.

Way 3-4: The first time length threshold is obtained through predefined or preconfigured information. In the above solution, it can be understood that a plurality of time units whose time interval with the second time unit is not greater than the first time length threshold form a time range, and the first time unit is one of the time units within the time range. When the user equipment sends the sidelink data on the second time unit, it can use a sidelink channel busy measurement value corresponding to a time unit (i.e. the first time unit) within the time range to determine the transmission limit.

Way 3-5: The first time length threshold is determined based on a communication protocol.

In an example, the second time unit is slot i, the first time length threshold is X time slots, and the time range includes X time slots before slot i (that is, all time slots between slot i-X and slot i-1).

In an example, the second time unit is slot i, the first time length threshold is X milliseconds (ms), and the time range includes all time slots within the X milliseconds before slot i.

In an example, the second time unit is slot i, the first time length threshold is X time slots, and the time range includes all time slots from slot i-X to slot i-Y. The value of Y is determined based on a processing delay of CBR measurement.

In the above solutions, a possible value set of X can be preconfigured to the user equipment. The base station indicates, through the downlink control information, the user equipment which value in the value set to use. In an example, the possible value set of X is (200, 300, 400, 500, 600, 700, 800, 1000).

In an embodiment of the present disclosure, if the user equipment cannot obtain the sidelink channel busy measurement value corresponding to the first time unit, the user equipment uses a default measurement value as the sidelink channel busy measurement value.

The default measurement value can be determined in any of the following ways.

Way 4-1: The sidelink channel busy measurement value is determined through downlink control information sent by a base station.

Way 4-2: The sidelink channel busy measurement value is determined through an identifier indicating the sidelink channel busy measurement value sent by the base station, and a correspondence between the identifier and the sidelink channel busy measurement value in the communication protocol.

Way 4-3: The sidelink channel busy measurement value is determined through the identifier indicating the sidelink channel busy measurement value sent by the base station, and a correspondence between the identifier and the sidelink channel busy measurement value sent by the base station.

Way 4-4: The default measurement value is obtained through predefined or preconfigured information. In an example, the user equipment may enter an energy-saving state and no longer performs receiving and/or measuring operation, thus, the CBR measurement requirements cannot be satisfied in some time units. That is, the sidelink channel busy measurement value corresponding to these time units cannot be obtained. For example, the CBR measurement requires measuring in 100 or $100 \cdot 2^\mu$ time slots ahead of a certain time slot to obtain a CBR measurement value of the certain time slot. If the user equipment enters the energy-saving state in some of the 100 or $100 \cdot 2^\mu$ time slots without monitoring, the corresponding sidelink channel busy measurement value cannot be obtained in the certain timeslot.

When the corresponding sidelink channel busy measurement value cannot be obtained in all time units (i.e. all time units within the time range described in the above solution) that meet the defined condition with respect to the second time unit, the user equipment uses a default measurement value as the sidelink channel busy measurement value for determining the transmission limit.

In an embodiment of the present disclosure, when corresponding sidelink channel busy measurement values can be obtained in multiple time units of all the time units (i.e. all time units within the time range in the above scheme) that meet the defined condition with respect to the second time unit, the user equipment can select one time unit (i.e. the first time unit) from the multiple time units. The transmission limit is determined based on a sidelink channel busy measurement value corresponding to the selected time unit.

The user equipment can select the first time unit from the multiple time units in any of the following ways.

Way 1: The user equipment randomly selects a time unit from the multiple time units as the first time unit.

Way 2: The user equipment selects a time unit closest to the second time unit from the multiple time units as the first time unit.

It should be noted that the first time unit is the time unit closest to the second time unit among the multiple time units, and each time unit in the multiple time units meets the defined condition with respect to the first time unit.

In the above solution, a specific mechanism can be adopted to ensure that the user equipment can obtain the corresponding sidelink channel busy measurement value in at least one time unit within the time range. For example, according to the high-level configuration information, the user equipment intends to measure in 100 time units before a time unit to obtain the sidelink channel busy measurement value corresponding to the time unit. The time range is from a time unit n-X to a time unit n-Y, where X=1000, then the user equipment can performing measurement in 100 consecutive time units every T time units to obtain a sidelink channel busy measurement value. As long as T is not greater than 1000, it can be ensured that, no matter where the arrival time of the sidelink data is, the user equipment can obtain a sidelink channel busy measurement value corresponding to at least one time point in the corresponding time range. Optionally, the user equipment can enter the energy-saving state as required in time units between two groups of 100 time units.

In an embodiment of the disclosure, a flexible CBR measurement mechanism is also provided. That is, different user equipment can use different CBR measurement methods, or user equipment in different states can use different CBR measurement methods. The CBR measurement mechanism is described below.

CBR Measurement Mechanism 1:

Compared with a user equipment in the non energy-saving state, a user equipment in the energy-saving state can use a relatively small number of measurement time units (that is, the number of time units included in the measurement time unit set is small) for CBR measurement.

The user equipment determines the number of measurement time units required for CBR measurement according to the received downlink signaling sent by the base station. For example, the number of time units for CBR measurement configured for an ordinary user equipment (i.e. user equipment in the non energy-saving state) is 1000 or $100 \cdot 2^\mu$. Furthermore, the number of time units for CBR measurement configured for the user equipment in the energy-saving state is R times that of the ordinary user equipment. R is less than 1 and greater than 0, for example, R is ½, ⅓ or ¼.

CBR Measurement Mechanism 2:

Compared with the user equipment in the non energy saving state, the user equipment in the energy saving state can use a relatively small number of measurement time units (that is, the number of time units included in the measurement time unit set is small) for CBR measurement. For an ordinary user equipment (i.e. the user equipment in the non energy saving state), all time units in the measurement time unit set can be measured to determine the sidelink channel busy measurement value. For an energy-saving user equipment, the sidelink channel busy measurement value can be determined by measuring part of the measurement time unit set. For example, for a CBR measurement value corresponding to slot n, it is originally defined as a proportion of sidelink channels whose RSSI measurement values exceed an RSSI threshold in a sidelink communication resource pool in a measurement window from slot n-a to slot n-1. The definition can be changed as follows: at least b time units are selected from a measurement window from slot n-A to slot n-1, a proportion of sidelink channels whose RSSI measurement values exceeds the RSSI threshold in the sidelink communication resource pool in these selected time units. In this way, the user equipment can obtain the CBR measurement value only by monitoring and measuring b time units in each A time units, and the user equipment can enter the energy-saving state as required in other time units.

In the above solution, the values of A and b can be determined based on predefined or preconfigured information, or based on downlink control information received from the base station.

In the technical solution of the embodiment of the present disclosure, the user equipment does not need to continuously measure the sidelink channel busy measurement value (that is, it does not need to measure the sidelink channel busy measurement value of all time units), but only needs to measure the sidelink channel busy measurement value of the time units that meet the defined condition with respected to the second time unit, thus saving the energy consumption of the user equipment.

Figures 3, 4:
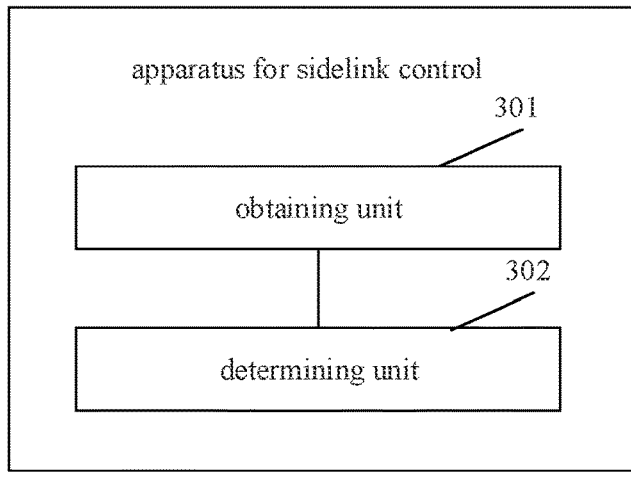
FIG. 3 is a block diagram illustrating an apparatus for sidelink control according to an embodiment of the present disclosure.
FIG. 4 is a schematic diagram illustrating a user equipment according to an embodiment of the present disclosure.

FIG. 3 is a block diagram illustrating an apparatus for sidelink control according to an embodiment of the present disclosure. As illustrated in FIG. 3, the apparatus for sidelink control includes:

an obtaining unit 301, configured to obtain a sidelink channel busy measurement value corresponding to a first time unit; and a determining unit 302, configured to determine a transmission limit of sidelink communication on a second time unit according to the sidelink channel busy measurement value; in which, the second time unit meets a defined condition with respect to the first time unit.

In an optional embodiment of the present disclosure, the transmission limit includes at least one of:

a maximum sending power allowed;

an available modulation encoding mode;

a maximum duration occupied by a transmission;

a number of frequency resources occupied by a transmission;

a maximum number of retransmissions of a data block; or an upper limit of channel occupancy ratio CR.

In an optional embodiment of the present disclosure, the defined condition includes:

a time interval between the first time unit and the second time unit is not greater than a first time length threshold.

In an optional embodiment of the present disclosure, the obtaining unit 301 is configured to perform any of:

determining the first time length threshold based on predefined or preconfigured information; or, determining the first time length threshold based on a communication protocol; or, determining the first time length threshold based on downlink control information sent by a base station; or determining the first time length threshold based on an identifier indicating the first time length threshold sent by the base station, and a correspondence between the identifier and the first time length in the communication protocol; or determining the first time length threshold based on the identifier indicating the first time length threshold sent by the base station, and a correspondence between the identifier and the first time length sent by the base station.

In an optional embodiment of the present disclosure, the sidelink channel busy measurement value is a default measurement value.

In an optional embodiment of the present disclosure, the obtaining unit 301 is configured to perform any of:

obtaining the default measurement value through the predefined or pre-configured information; or, determining the sidelink channel busy measurement value based on downlink control information sent by a base station; or.

determining the sidelink channel busy measurement value based on an identifier indicating the sidelink channel busy measurement value sent by the base station, and a correspondence between an identifier and the sidelink channel busy measurement value in a communication protocol; or, determining the sidelink channel busy measurement value based on the identifier indicating the sidelink channel busy measurement value sent by the base station, and a correspondence between an identifier and the sidelink channel busy measurement value sent by the base station.

In an optional embodiment of the present disclosure, the first time unit is a time unit closest to the second time unit in a candidate time unit, and the candidate time unit is one or more time units meeting the defined condition with respect to the first time unit.

In an optional embodiment of the present disclosure, the obtaining unit 301 is configured to: determine a measurement time unit set according to the first time unit; and determine the sidelink channel busy measurement value by measuring a sidelink channel on the measurement time unit set.

In an optional embodiment of the present disclosure, time units within the measurement time unit set are not later than the first time unit, and a distance between the first time unit and each time unit within the measurement time unit set is not greater than a second time length threshold; and/or, a number of time units within the measurement time unit set is not less than a first number threshold.

In an optional embodiment of the present disclosure, the second time length threshold is determined based on a state of the user equipment.

In an optional embodiment of the present disclosure, different states of the user equipment corresponds different second time length thresholds.

In an optional embodiment of the present disclosure, the obtaining unit 301 is configured to perform any of:

obtaining the first number threshold based on predefined or pre-configured information; or, determining the first number threshold based on downlink control information sent by a base station; or, determining the first number threshold based on an identifier indicating the first number threshold sent by the base station, and a correspondence between the identifier and the first number threshold in a communication protocol; or, determining the first number threshold based on the identifier indicating the first number threshold sent by the base station, and a correspondence between the identifier and the first number threshold sent by the base station.

It should be noted that the specific mode of each unit in the above apparatus for sidelink control to perform operations has been described in detail in the embodiment of the method, and will not be described in detail here.

In an embodiment, the respective units in the above apparatus for sidelink control can be implemented by one or more central processing units (CPU), graphics processing units (GPU), baseband processors (BP), application specific integrated circuits (ASICs), digital signal processors (DSP), programmable logic devices (PLDs), complex programmable logic devices (CPLD), field programmable gate arrays (FPGA), general processors, controllers, micro controller units (MCU), microprocessors, or other electronic components, or may be implemented in combination with one or more RF (radio frequency) antennas, to perform the above method for sidelink control.

In the technical solutions of the embodiment of the present disclosure, when the user equipment intends to conduct sidelink communication on the second time unit, the user equipment can obtain the sidelink channel busy measurement value corresponding to the first time unit. The first time unit refers to a time unit that meets the defined condition with respect to the second time unit. The user equipment determines the transmission limit of the sidelink communication according to the obtained sidelink channel busy measurement value. In this way, the user equipment does not need to continuously measure the sidelink channel busy measurement value (that is, it does not need to measure the sidelink channel busy measurement value of all time units), but only needs to measure the sidelink channel busy measurement value of the time units that meet the defined condition with respected to the second time unit, saving the energy consumption of the user equipment.

FIG. 4 is a schematic diagram illustrating a user equipment 4000 according to an embodiment of the present disclosure. For example, the user equipment 4000 may be a mobile phone, a computer, a digital broadcasting terminal, a messaging device, a game console, a tablet device, a medical equipment, a fitness equipment, a personal digital assistant, and so on.

Referring to FIG. 4, the user equipment 4000 may include one or more components of the followings: a processing component 4002, a memory 4004, a power supply component 4006, a multimedia component 4008, an audio component 4010, an input/output (I/O) interface 4012, a sensor component 4014, and a communication component 4016.

The processing component 4002 generally controls the whole operation of the user equipment 4000, such as the operations related to display, phone call, data communication, camera operation and recording operation. The processing component 4002 may include one or more processors 4020 to perform instructions, to complete all or part of steps of the above method. In addition, the processing component 4002 may include one or more modules for the convenience of interaction between the processing component 4002 and other components. For example, the processing component 4002 may include a multimedia module for the convenience of interaction between the multimedia component 4008 and the processing component 4002.

The memory 4004 is configured to store various types of data to support the operation of the user equipment 4000. Examples of the data include the instructions of any applications or methods operated on the user equipment 4000, contact data, phone book data, messages, pictures, videos, etc. The memory 4004 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 4006 may provide power for all components of the user equipment 4000. The power supply component 4006 may include a power supply management system, one or more power supplies, and other units related to generating, managing and distributing power for the user equipment 4000.

The multimedia component 4008 includes a screen provided an output interface between the user equipment 4000 and the user. In some embodiments, the screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 4008 includes a front camera and/or a rear camera. When the user equipment 4000 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 4010 is configured to output and/or input an audio signal. For example, the audio component 4010 includes a microphone (MIC). When the user equipment 4000 is in an operation mode, such as a call mode, a record mode, and a speech recognition mode, the microphone is configured to receive an external audio signal. The received audio signal may be further stored in the memory 4004 or sent via the communication component 4016. In some embodiments, the audio component 4010 further includes a speaker configured to output an audio signal.

The I/O interface 4012 provides an interface for the processing component 4002 and the peripheral interface module, and the peripheral interface module may be a keyboard, a click wheel, a button, etc. The button may include is but not limited to a home button, a volume button, a start button and a lock button.

The sensor component 4014 includes one or more sensors, configured to provide various aspects of status assessment for the user equipment 4000. For example, the sensor component 4014 may detect the on/off state of the user equipment 4000 and the relative positioning of the component. For example, the component is a display and a keypad of the user equipment 4000. The sensor component 4014 may further detect the location change of the user equipment 4000 or one component of the user equipment 4000, the presence or absence of contact between the user and the user equipment 4000, the orientation or acceleration/deceleration of the user equipment 4000, and the temperature change of the user equipment 4000. The sensor component 4014 may include a proximity sensor configured to detect the existence of the objects nearby without any physical contact. The sensor component 4014 may further include a light sensor such as a complementary metal oxide semiconductor (CMOS) or a charge-coupled device (CCD) image sensor, which is configured to use in imaging applications. In some embodiments, the sensor component 4014 may further include an acceleration transducer, a gyroscope sensor, a magnetic sensor, a pressure sensor or a temperature sensor.

The communication component 4016 is configured for the convenience of wire or wireless communication between the user equipment 4000 and other devices. The user equipment 4000 may access wireless networks based on communication standard, such as Wi-Fi, 2G, 3G, 4G, 5G, or 6G, or their combination. In an embodiment, the communication component 4016 receives broadcast signals or from an external broadcast management system or broadcast related information via a broadcast channel. In an embodiment, the communication component 4016 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the user equipment 4000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 4004 including instructions, the instructions may be executed by the processor 4020 of the user equipment 4000 to complete the above methods. For example, the non-transitory computer-readable storage medium may be a ROM, a random access memory (RAM), a CD-ROM, a magnetic tape, a floppy disk, an optical data storage device, etc.

After considering the specification and practicing the disclosure herein, those skilled in the art will easily think of other implementations of embodiments of the disclosure. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as examples only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

What is claimed is:

1. A method for sidelink control, comprising:
 receiving, by a user equipment, configuration information;
 determining, by the user equipment, a sidelink channel busy ratio measurement value corresponding to a first time unit based on a proportion of sidelink channels having a received signal strength indication (RSSI) measurement value greater than a configured threshold over a measurement time unit set, wherein the measurement time unit set comprises B time units selected from A time units before the first time unit, where A and B are numbers determined based on the configuration information, and B is less than A, and wherein the B time units are selected from the A time units according to time units within which the user equipment enters an energy-saving state; and
 determining, by the user equipment, a transmission limit of sidelink communication on a second time unit according to the sidelink channel busy ratio measurement value;
 wherein the second time unit meets a defined condition with respect to the first time unit;
 wherein the measurement time unit set used for the user equipment in the energy-saving state to determine the sidelink channel busy ratio measurement value is a subset of a measurement time unit set used for the user equipment in a non-energy-saving state to determine the sidelink channel busy ratio measurement value; and wherein in a case where a number of B time units greater than a first number threshold cannot be selected from the A time units, the sidelink channel busy ratio measurement value is determined as a default value.

2. The method of claim 1, wherein A represents a number of time units used by the user equipment in the non-energy-saving state for determining the sidelink channel busy ratio measurement value.

3. The method of claim 1, wherein the defined condition comprises:
 a time interval between the first time unit and the second time unit is not greater than a first time length threshold.

4. The method of claim 3, further comprising determining the first time length threshold based on at least one of:
 a communication protocol;
 predefined or pre-configured information;
 downlink control information sent by a base station;
 an identifier indicating the first time length threshold sent by the base station, and a correspondence between the identifier and the first time length in the communication protocol; or
 the identifier indicating the first time length threshold sent by the base station, and a correspondence between the identifier and the first time length sent by the base station.

5. The method of claim 1, wherein the sidelink channel busy ratio measurement value is a default measurement value in a case that a number of time units used by the user equipment for determining the sidelink channel busy ratio measurement value is below a preconfigured threshold.

6. The method of claim 5, further comprising at least one of:
 obtaining, by the user equipment, the default measurement value through predefined or pre-configured information; or
 determining the sidelink channel busy ratio measurement value based on at least one of:
 downlink control information sent by a base station;
 an identifier indicating the sidelink channel busy ratio measurement value sent by the base station, and a correspondence between an identifier and the sidelink channel busy ratio measurement value in a communication protocol; or
 the identifier indicating the sidelink channel busy ratio measurement value sent by the base station, and a correspondence between the identifier and the sidelink channel busy ratio measurement value sent by the base station.

7. The method of claim 1, wherein the first time unit is a time unit closest to the second time unit in a candidate time unit, and the candidate time unit is one or more time units meeting the defined condition with respect to the first time unit.

8. The method of claim 1, wherein,
 time units within the measurement time unit set are not later than the first time unit, and a distance between the first time unit and each time unit within the measurement time unit set is not greater than a second time length threshold; or
 a number of time units within the measurement time unit set is not less than the first number threshold.

9. The method of claim 8, wherein the second time length threshold is determined based on a state of the user equipment.

10. The method of claim 9, further comprising:

determining the second time length threshold corresponding to each state of the user equipment based on downlink control information sent by a base station; or determining the second time length threshold corresponding to each state of the user equipment based on a communication protocol.

11. The method of claim 8, further comprising at least one of:

obtaining the first number threshold based on predefined or pre-configured information; or determining the first number threshold based on at least one of:

a state of the user equipment;

downlink control information sent by a base station;

an identifier indicating the first number threshold sent by the base station, and a correspondence between the identifier and the first number threshold in a communication protocol; or the identifier indicating the first number threshold sent by the base station, and a correspondence between the identifier and the first number threshold sent by the base station.

12. The method of claim 1, wherein the B time units are explicitly indicated in the configuration information as non-contiguous units selected from the A time units.

13. A user equipment, comprising:

a processor;

a transceiver; and a memory storing executable programs, wherein the processor is configured to:

receive configuration information;

determine a sidelink channel busy ratio measurement value corresponding to a first time unit based on a proportion of sidelink channels having a received signal strength indication (RSSI) measurement value greater than a configured threshold over a measurement time unit set, wherein the measurement time unit set comprises B time units selected from A time units before the first time unit, where A and B are numbers determined based on the configuration information, and B is less than A, wherein the B time units are selected from the A time units according to time units within which the user equipment enters an energy-saving state; and determine a transmission limit of sidelink communication on a second time unit according to the sidelink channel busy ratio measurement value;

wherein the second time unit meets a defined condition with respect to the first time unit;

wherein the measurement time unit set used for the user equipment in the energy-saving state to determine the sidelink channel busy ratio measurement value is a subset of a measurement time unit set used for a user equipment in a non-energy-saving state to determine the sidelink channel busy ratio measurement value; and wherein in a case where a number of B time units greater than a first number threshold cannot be selected from the A time units, the sidelink channel busy ratio measurement value is determined as a default value.

14. The user equipment of claim 13, wherein A represents a number of time units used by the user equipment in the non-energy-saving state for determining the sidelink channel busy ratio measurement value.

15. The user equipment of claim 13, wherein the defined condition comprises:

a time interval between the first time unit and the second time unit is not greater than a first time length threshold.

16. The user equipment of claim 15, wherein the processor is further configured to determine the first time length threshold based on at least one of:

a communication protocol;

predefined or pre-configured information;

downlink control information sent by a base station;

an identifier indicating the first time length threshold sent by the base station, and a correspondence between the identifier and the first time length in the communication protocol; or the identifier indicating the first time length threshold sent by the base station, and a correspondence between the identifier and the first time length sent by the base station.

17. The user equipment of claim 13, wherein the sidelink channel busy ratio measurement value is a default measurement value in a case that a number of time units used by the user equipment for determining the sidelink channel busy ratio measurement value is below a preconfigured threshold.

18. The user equipment of claim 17, wherein the processor is further configured to perform at least one of:

obtaining the default measurement value through predefined or pre-configured information; or determining the sidelink channel busy ratio measurement value based on at least one of:

downlink control information sent by a base station;

an identifier indicating the sidelink channel busy ratio measurement value sent by the base station, and a correspondence between an identifier and the sidelink channel busy ratio measurement value in a communication protocol; or the identifier indicating the sidelink channel busy ratio measurement value sent by the base station, and a correspondence between the identifier and the sidelink channel busy ratio measurement value sent by the base station.

19. The user equipment of claim 13, wherein the first time unit is a time unit closest to the second time unit in a candidate time unit, and the candidate time unit is one or more time units meeting the defined condition with respect to the first time unit.

20. A non-transitory storage medium having executable programs stored thereon, wherein, when the executable programs are executed by a processor of a user equipment, the user equipment is caused to perform:

receiving configuration information;

determining a sidelink channel busy ratio measurement value corresponding to a first time unit based on a proportion of sidelink channels having a received signal strength indication (RSSI) measurement value greater than a configured threshold over a measurement time unit set, wherein the measurement time unit set comprises B time units selected from A time units before the first time unit, where A and B are numbers determined based on the configuration information, and B is less than A, wherein the B time units are selected from the A time units according to time units within which the user equipment enters an energy-saving state; and determining a transmission limit of sidelink communication on a second time unit according to the sidelink channel busy ratio measurement value;

wherein the second time unit meets a defined condition with respect to the first time unit;

wherein the measurement time unit set used for the user equipment in the energy-saving state to determine the sidelink channel busy ratio measurement value is a subset of a measurement time unit set used for the user equipment in a non-energy-saving state to determine the sidelink channel busy ratio measurement value; and wherein in a case where a number of B time units greater than a first number threshold cannot be selected from the A time units, the sidelink channel busy ratio measurement value is determined as a default value.

* * * * *